United States Patent
Matsumura

(10) Patent No.: US 8,533,725 B2
(45) Date of Patent: Sep. 10, 2013

(54) INFORMATION PROCESSING SYSTEM AND USE RIGHT COLLECTIVE MANAGEMENT METHOD

(75) Inventor: Kenichiro Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 13/064,846

(22) Filed: Apr. 20, 2011

(65) Prior Publication Data

US 2011/0258633 A1 Oct. 20, 2011

Related U.S. Application Data

(63) Continuation of application No. PCT/JP2008/069025, filed on Oct. 21, 2008.

(51) Int. Cl.
*G06F 9/46* (2006.01)
(52) U.S. Cl.
USPC .......................................... 718/104; 718/105
(58) Field of Classification Search
USPC .......................................... 718/103, 104, 105
See application file for complete search history.

(56) References Cited

U.S. PATENT DOCUMENTS

| | | | | |
|---|---|---|---|---|
| 7,035,918 B1 * | 4/2006 | Redding et al. | ............... | 709/223 |
| 7,228,545 B2 * | 6/2007 | Circenis et al. | ............... | 718/102 |
| 7,373,497 B2 * | 5/2008 | Circenis et al. | ............... | 713/100 |
| 7,681,241 B2 * | 3/2010 | Cox | ............... | 726/27 |
| 7,702,903 B1 * | 4/2010 | Roy et al. | ............... | 713/158 |
| 8,082,547 B1 * | 12/2011 | Herington et al. | ............... | 718/104 |
| 2004/0078339 A1 * | 4/2004 | Goringe et al. | ............... | 705/59 |
| 2004/0199632 A1 | 10/2004 | Romero et al. | | |
| 2005/0060388 A1 * | 3/2005 | Tatsumi et al. | ............... | 709/220 |
| 2005/0125521 A1 | 6/2005 | Grimm et al. | | |
| 2005/0132347 A1 * | 6/2005 | Harper et al. | ............... | 717/168 |
| 2006/0130070 A1 * | 6/2006 | Graf | ............... | 719/318 |
| 2008/0281625 A1 * | 11/2008 | Shiki | ............... | 705/1 |

FOREIGN PATENT DOCUMENTS

| | | |
|---|---|---|
| JP | 2003-067351 | 3/2003 |
| JP | 2004-288183 | 10/2004 |
| JP | 2005-166052 | 6/2005 |

OTHER PUBLICATIONS

International Search Report for PCT/JP2008/069025, mailed Feb. 17, 2009.

* cited by examiner

*Primary Examiner* — Van Nguyen
(74) *Attorney, Agent, or Firm* — Staas & Halsey LLP

(57) ABSTRACT

Disclosed is an information processing system including plural information processing apparatuses that have respective hardware resources including hardware resources to be licensed, each information processing apparatus performing information processing using the licensed hardware resources in which use rights are allocated; and a management apparatus that is connected to the plural information processing apparatuses and manages the hardware resources of the plural information processing apparatuses. The management apparatus includes a use right information holding unit that holds use right information corresponding to the use rights of the hardware resources, and a use right allocation unit that allocates the use rights to the hardware resources on a hardware resource basis in accordance with the held use right information.

7 Claims, 16 Drawing Sheets

FIG.4

APPARATUS INFORMATION MANAGEMENT TABLE 140

| INFORMATION PROCESSING APPARATUS (INFORMATION UNIQUE TO APPARATUS) | MINIMUM RESOURCE UNIT (INFORMATION UNIQUE TO RESOURCE) |
|---|---|
| INFORMATION PROCESSING APPARATUS(#a) (UNIQUE INFORMATION#a) | ⋮ |
| | CORE(#a1) (UNIQUE INFORMATION#ca1) |
| | CORE(#a2) (UNIQUE INFORMATION#ca2) |
| | ⋮ |
| | MEMORY(#a1) (UNIQUE INFORMATION#ma1) |
| | ⋮ |
| ⋮ | ⋮ |

FIG.5

STATUS INFORMATION MANAGEMENT TABLE  141

| RESOURCE | STATUS |
|---|---|
| ⋮ | ⋮ |
| CORE(#a1) | ON |
| CORE(#a2) | OFF |
| ⋮ | ⋮ |
| MEMORY(#a1) | ON |
| ⋮ | ⋮ |

FIG.6

LOAD CONDITION MANAGEMENT TABLE 142

| RESOURCE | LOAD CONDITION |
|---|---|
| ⋮ | ⋮ |
| CORE(#a1) | 20% |
| CORE(#a2) | — |
| ⋮ | ⋮ |
| MEMORY(#a1) | 50% |
| ⋮ | ⋮ |

INFORMATION PROCESSING SYSTEM AND USE RIGHT COLLECTIVE MANAGEMENT METHOD

CROSS-REFERENCE TO RELATED APPLICATION

This application is a U.S. continuation application filed under 35 U.S.C. 111(a) claiming benefit under 35 U.S.C. 120 and 365(c) of PCT application JP2008/069025, filed on Oct. 21, 2008, the entire contents of which are incorporated herein by reference.

FIELD

The embodiment discussed herein is related to a technology for managing the use rights of hardware resources such as CPUs and memories installed in information processing apparatuses, and related to an information processing system and a use right collective management method capable of collectively managing, for example, the hardware resources of plural information processing apparatuses.

BACKGROUND

Up until now, there has been discussed enabling plural computers having a capacity-on-demand (COD) function to deal with changing workloads without physically transferring standby resources or workloads associated with the computers.

Japanese Laid-open Patent Publication No. 2005-166052 is an example of a document disclosing technology corresponding to COD.

SUMMARY

According to an aspect of the present invention, there is provided an information processing system including plural information processing apparatuses that have respective hardware resources including hardware resources to be licensed, each information processing apparatus performing information processing using the licensed hardware resources in which use rights are allocated; and a management apparatus that is connected to the plural information processing apparatuses and manages the hardware resources of the plural information processing apparatuses. The management apparatus includes use right information holding unit that holds use right information corresponding to the use rights of the hardware resources, and a use right allocation unit that allocates the use rights to the hardware resources on a hardware resource basis in accordance with the held use right information.

The object and advantages of the present invention will be realized and attained by means of the elements and combinations particularly pointed out in the claims.

It is to be understood that both the foregoing general description and the following detailed description are exemplary and explanatory and are not restrictive of the present invention as claimed.

BRIEF DESCRIPTION OF DRAWINGS

FIG. 4 illustrates an example of an apparatus information management table according to the embodiment of the present invention;

FIG. 5 illustrates an example of a status information management table according to the embodiment of the present invention;

FIG. 6 illustrates an example of a load condition management table according to the embodiment of the present invention;

DESCRIPTION OF EMBODIMENTS

In an information processing system having plural information processing apparatuses, it has been known as a technology that spare hardware resources are provided in advance in the respective information processing apparatuses besides hardware resources such as CPUs and memories required for operations when they are introduced into the system.

Such hardware resources are provided in the respective information processing apparatuses for the purpose of, for example, improving processing performance in a short period of time and restoring degraded processing performance due to the failures of the CPUs in a short period of time. By purchasing the use rights of the spare hardware resources required according to the expansion of the operations, the user can strengthen the resources of the respective information processing apparatuses without stopping the operations in progress.

Figure 1:
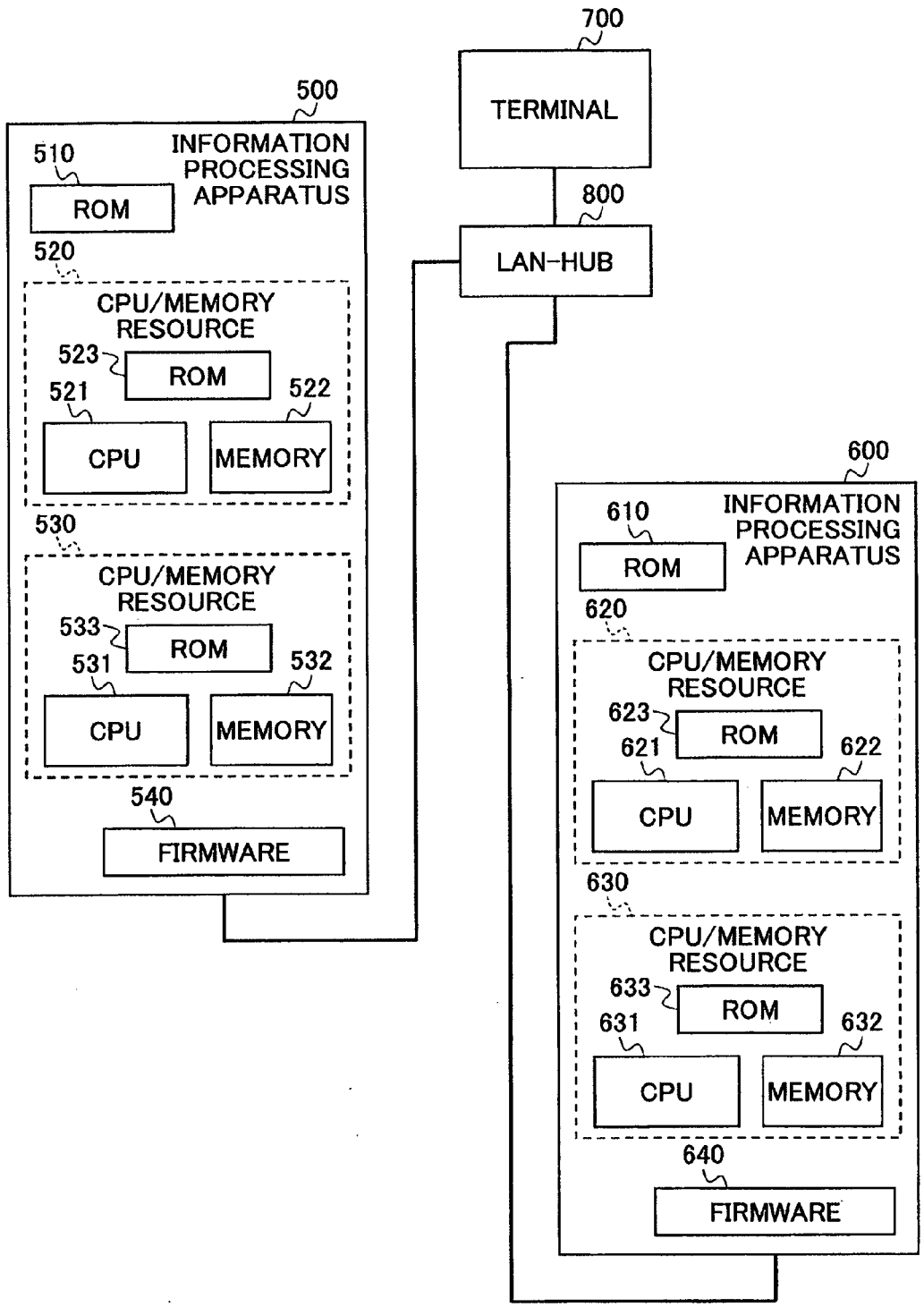
FIG. 1 is a diagram illustrating an example of an information processing system including plural information processing apparatuses having respective CPU/memory resources.

FIG. 1 is a diagram illustrating an example of an information processing system including plural information processing apparatuses having respective CPU/memory resources.

The information processing system illustrated in FIG. 1 has two information processing apparatuses 500 and 600. The information processing apparatus 500 has a ROM 510, a CPU/memory resource 520, a CPU/memory resource 530, and a firmware program 540. The information processing apparatus 600 has a ROM 610, a CPU/memory resource 620, a CPU/memory resource 630, and a firmware program 640.

The ROMs 510 and 610 store unique information as the identification information of the information processing apparatuses 500 and 600, or the like, respectively.

As the CPU/memory resources of the information processing apparatuses 500 and 600, there are the CPU/memory resources 520 and 620 made available since the introduction into the system and the spare CPU/memory resources 530 and 630. The spare CPU/memory resources 530 and 630 are installed for the purpose of, for example, improving processing performance in a short period of time and restoring degraded processing performance due to the failures of the CPUs in a short period of time. At the introduction into the system, the available CPU/memory resources 520 and 620 are active while the spare CPU/memory resources 530 and 630 are inactive.

The CPU/memory resources 520, 530, 620, and 630 have CPUs 521, 531, 621, and 631; memories 522, 532, 622, and 632; and ROMs 523, 533, 623 and 633, respectively. The ROMs 523, 533, 623, and 633 store information as to whether the CPU/memory resources 520, 530, 620, and 630 are available resources or spare resources, or the like, respectively.

The firmware programs 540 and 640 manage license keys generated based on the unique information of the ROMs 510 and 610, respectively. The license keys are password information required to use the spare CPU/memory resources.

A terminal 700 is connected to the two information processing apparatuses 500 and 600 via a LAN-HUB 800, and serves as a management terminal used when the user accesses the information processing apparatuses 500 and 600. Here, the user uses the terminal 700 to input the purchased license keys to the firmware programs 540 and 640 and make the spare CPU/memory resources 530 and 630 available.

Hereinafter, a description is made of a procedure for adding the spare CPU/memory resource 530 to the information processing apparatus 500 due to an excess of operations.

1) The user purchases from a manufacturer a license key to acquire the use right of a spare CPU/memory resource that the user wants to activate.

For example, when the user wants to activate the spare CPU/memory resource 530 of the information processing apparatus 500 in the system illustrated in FIG. 1, he/she purchases from a manufacturer a license key to activate the spare CPU/memory resource 530 of the information processing apparatus 500.

2) By using the acquired license key, the user accesses the firmware program 540 of the information processing apparatus 500 from the terminal 700 and activates the spare CPU/memory resource 530.

For example, the user accesses the information processing apparatus 500 with the terminal 700, and inputs and transmits the license key purchased from the manufacturer with the terminal 700 to the firmware program 540. The firmware program 540 authenticates the license key and activates the spare CPU/memory resource 530 if the authenticated license key is valid.

As described above, the user purchases the license key to acquire the use right of the spare CPU/memory resource 530 that he/she wants to activate, and inputs the license key with the terminal 700 to activate the spare CPU/memory resource 530. Thus, the user can strengthen the resources of the information processing apparatus 500 without stopping operations in progress.

Note that in a case where the spare CPU/memory resource 630 is also added to the information processing apparatus 600 due to an excess of operations, the spare CPU/memory resource 630 must be separately activated according to the above procedure.

However, there are the following problems in the management using the use rights of the spare CPU/memory resources.

1) The license keys of the spare CPU/memory resources are uniquely allocated to the respective information processing apparatuses. Once the use rights of the spare CPU/memory resources are acquired, the use rights of the CPU/memory resources become valid. Therefore, the acquired use rights cannot be disclaimed.

Consequently, even if the user purchases the license keys of the spare resources due to a temporary excess of operations or in order to temporarily deal with the failures of the CPUs, he/she must continue to use the resources. This results in an increase in a burden to the user.

2) The acquired use rights are exercised on a predetermined physical CPU/memory resource basis. In other words, the use resources are added to the information processing apparatuses on a predetermined physical CPU/memory resource basis. The use rights on a single physical CPU/memory resource basis cannot be separately allocated to the plural information processing apparatuses.

Therefore, even in a case where the respective information processing apparatuses are only required to have the small number of the resources to deal with the problems, the use rights of the resources must be separately purchased for the information processing apparatuses. That is, the unnecessary resources must be purchased depending on cases, which results in an increase in the burden to the user.

3) Since the license keys are uniquely allocated to the respective information processing apparatuses, the purchased license keys cannot be applied to irrelevant information processing apparatuses.

Consequently, the user is required to purchase the license keys for the respective information processing apparatuses, which results in an increase in the burden to the user.

Next, referring to the accompanying drawings, an embodiment of the present invention is described.

Figure 2:
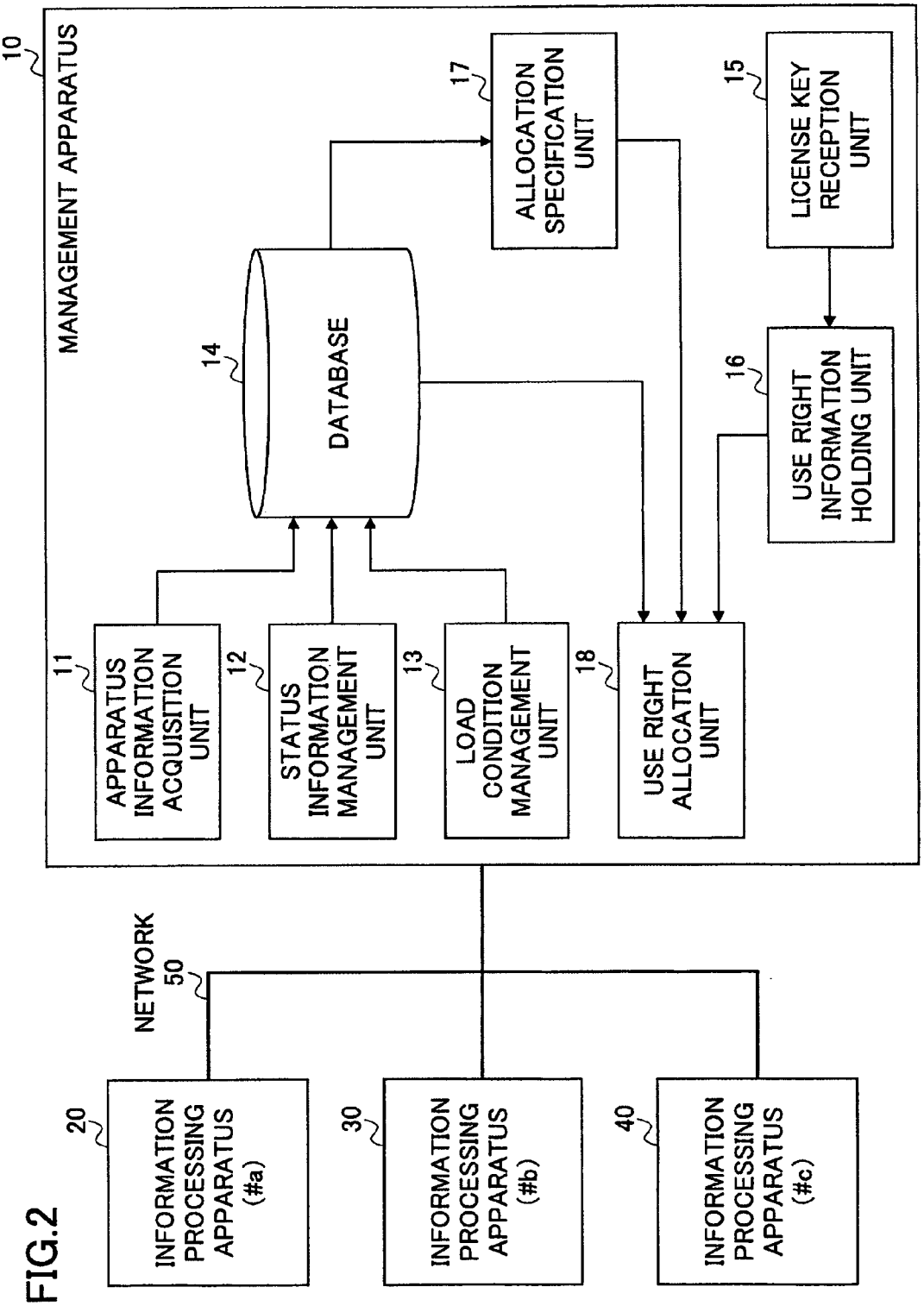
FIG. 2 is a diagram illustrating a configuration example of an information processing system according to an embodiment of the present invention.

FIG. 2 is a diagram illustrating a configuration example of an information processing system according to the embodiment of the present invention. The information processing system illustrated in FIG. 2 has plural information processing apparatuses 20, 30, and 40 and a management apparatus 10 having a monitoring mechanism that monitors the information processing apparatuses 20, 30, and 40.

The management apparatus 10 collectively manages the use rights of the hardware resources of the information processing apparatuses 20, 30, and 40. The management apparatus 10 monitors the statuses and the load conditions of the hardware resources of the information processing apparatuses 20, 30, and 40, allocates the collectively-managed use rights to the any of the information processing apparatuses on a predetermined logical resource basis, and stops.

The use rights are rights to use the hardware resources licensed from a manufacturer. The information processing apparatus to which the use rights are allocated can perform information processing by using the licensed hardware resources.

In the example illustrated in FIG. 2, the management apparatus 10 is connected to the three information processing apparatuses 20, 30, and 40 via a network 50.

Figure 3:
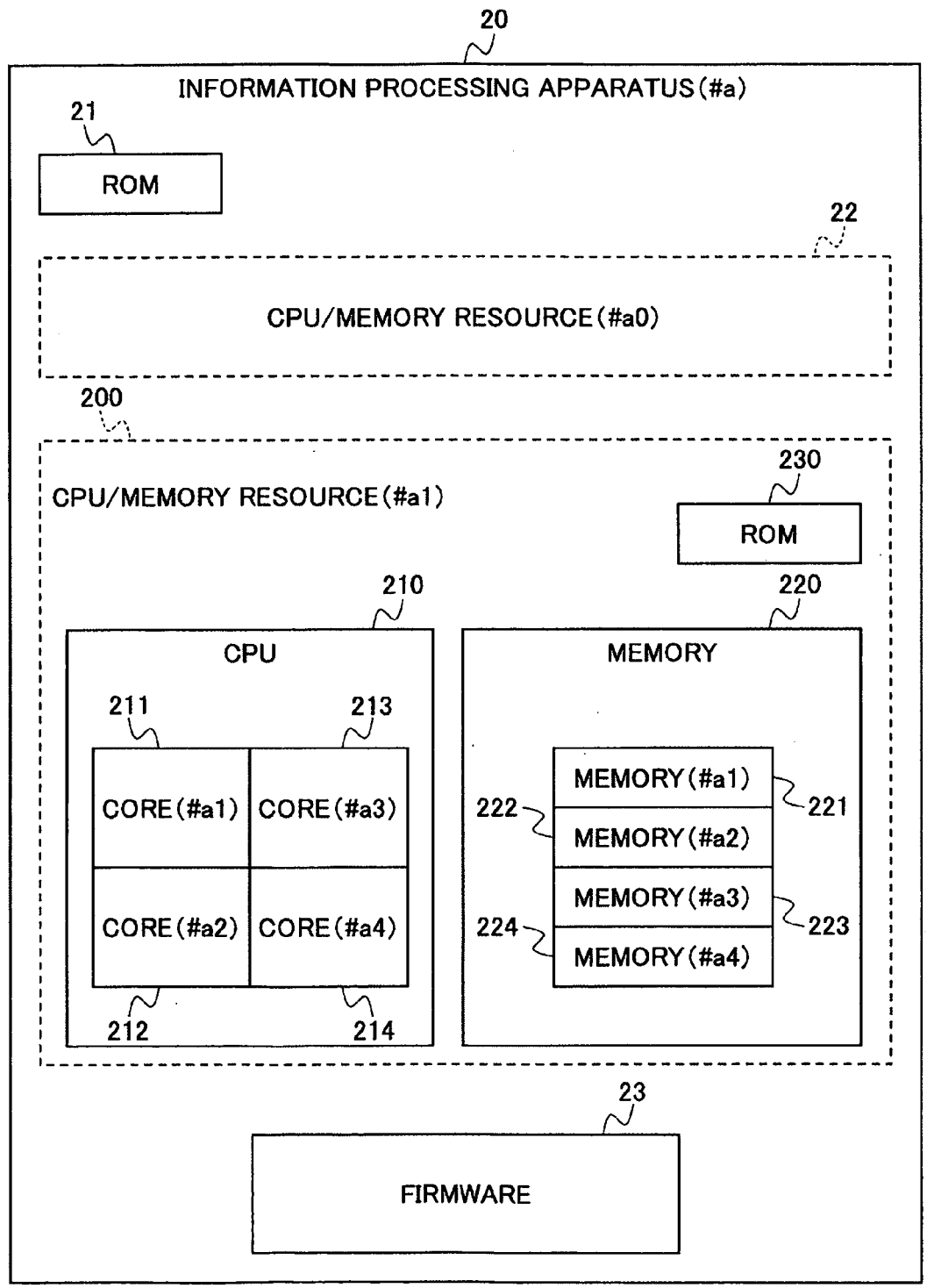
FIG. 3 is a diagram illustrating a configuration example of the information processing apparatus according to the embodiment of the present invention.

FIG. 3 is a diagram illustrating a configuration example of the information processing apparatus according to the embodiment of the present invention. The configuration example of the information processing apparatus illustrated in FIG. 3 is the configuration example of the information processing apparatus (#a) 20 among the three information processing apparatuses 20, 30, and 40.

The information processing apparatus (#a) 20 has a ROM 21, a CPU/memory resource (#a0) 22, a CPU/memory resource (#a1) 200, and a firmware program 23.

The ROM 21 stores unique information as the identification information of the information processing apparatus (#a) 20 or the like.

The information processing apparatus (#a) 20 illustrated in FIG. 3 has the two CPU/memory resources. Among the two CPU/memory resources, the CPU/memory resource (#a0) 22 is an activated resource while the CPU/memory resource (#a1) 200 is an inactivated resource installed as a spare resource.

The CPU/memory resource (#a1) 200 has a CPU 210, a memory 220, and a ROM 230.

The CPU 210 is a multi-core CPU composed of a core (#a1) 211, a core (#a2) 212, a core (#a3) 213, and a core (#a4) 214. According to the embodiment of the present invention, the units of the cores are used as the minimum units of the logical resources.

The memory 220 has four regions capable of being separately used, i.e., a memory (#a1) 221, a memory (#a2) 222, a memory (#a3) 223, and a memory (#a4) 224. According to the embodiment of the present invention, the units of the divided memory regions are used as the minimum units of the logical resources.

The ROM 230 stores information as to whether the CPU/memory resource (#a1) 200 where the ROM 230 is installed is an available resource or a spare resource, unique information corresponding to the cores of the CPU 210, and the like.

Note that it is assumed that the CPU/memory resource (#a0) 22 is similar in configuration to the CPU/memory resource (#a1) 200.

The firmware program 23 manages the unique information of the information processing apparatus (#a) 20, the unique information, statuses, and load conditions of the CPU/memory resources 22 and 200, and the like. The firmware program 23 is stored in a non-volatile memory or the like such as a ROM.

The statuses of the CPU/memory resources 22 and 200 are information indicating the ON/OFF statuses of the CPU/memory resources 22 and 200, i.e., information indicating whether the CPU/memory resources 22 and 200 are activated or inactivated. According to the embodiment of the present invention, the firmware program 23 manages the statuses of the CPU/memory resources 22 and 200 on a CPU core basis.

Further, according to the embodiment of the present invention, the firmware program 23 manages the use rates of the resources on a logical resource basis as the statuses of the loads of the CPU/memory resources 22 and 200.

Note that it is assumed that the information processing apparatus (#b) 30 and the information processing apparatus (#c) 40 are similar in configuration to the information processing apparatus (#a) 20 illustrated in FIG. 3.

As illustrated in FIG. 2, the management apparatus 10 has an apparatus information acquisition unit 11, a status information management unit 12, a load condition management unit 13, a database 14, a license key reception unit 15, a use right information holding unit 16, an allocation specification unit 17, and a use right allocation unit 18.

The apparatus information acquisition unit 11 acquires from the information processing apparatuses 20, 30, and 40 the unique information of the respective information processing apparatuses, the unique information of the resources corresponding to the minimum units, and information such as apparatus configuration, and stores the acquired information in the database 14 so as to be managed.

FIG. 4 illustrates an example of an apparatus information management table according to the embodiment of the present invention.

The database 14 stores an apparatus information management table 140 where the apparatus information acquired from the information processing apparatuses 20, 30, and 40 is managed. In the apparatus information management table 140 illustrated in FIG. 4, the unique information of the information processing apparatuses 20, 30, and 40 and the unique information of the resources corresponding to the minimum units of the resources in the respective information processing apparatuses are managed.

The status information management unit 12 acquires from the information processing apparatuses 20, 30, and 40 status information corresponding to the minimum units of the resources and stores the acquired status information in the database 14 so as to be managed.

FIG. 5 illustrates an example of a status information management table according to the embodiment of the present invention.

The database 14 stores a status information management table 141 where the status information acquired from the information processing apparatuses 20, 30, and 40 is managed. In the status information management table 141 illustrated in FIG. 5, the ON/OFF information of the statuses corresponding to the minimum units of the resources of the information processing apparatuses 20, 30, and 40 is managed.

In the status information management table 141 illustrated in FIG. 5, the resources in the ON status are activated while the resources in the OFF status are inactivated.

The load condition management unit 13 acquires from the information processing apparatuses 20, 30, and 40 load conditions corresponding to the minimum units of the resources and stores the acquired load conditions in the database 14 so as to be managed.

FIG. 6 illustrates an example of a load condition management table according to the embodiment of the present invention.

The database 14 stores a load condition management table 142 where load conditions acquired from the information processing apparatuses 20, 30, and 40 are managed. In the load condition management table 142 illustrated in FIG. 6, load conditions corresponding to the minimum units of the resources of the information processing apparatuses 20, 30, and 40, i.e., the use rates of the resources are managed.

The license key reception unit 15 receives a license key input by the user and authenticates the input license key.

The license key according to the embodiment of the present invention is not a license key to license the respective CPU/memory resources in the information processing apparatuses but is a license key to license a predetermined number of the resources in the entire information processing system. The user who wants to strengthen the resources of the information processing apparatuses 20, 30, and 40 purchases from a manufacturer the license key corresponding to the number of the resources to be strengthened in the entire information processing system.

After authenticating the input license key, the license key reception unit 15 holds in the use right information holding unit 16 use right information as information indicating the use rights of the number of the resources corresponding to the license key.

The use right information holding unit 16 is a storage unit that holds the use right information as the information of the use rights of the resources licensed for the entire information processing system. The use right information is, for example, information such as the number of resources licensed on a certain divided unit basis. Note that the use right information held in the use right information holding unit 16 may be the information of the use rights of all the resources including those now in use in the information processing system or may be the information of the use rights to be allocated to unused resources. According to the embodiment of the present invention, it is assumed that the use right information is the information of the use rights to be allocated to unused resources.

The allocation specification unit 17 specifies the allocation of the use rights of the resources in accordance with the use right information held in the use right information holding unit 16. The allocation of the use rights of the resources may be specified by the user or may be automatically determined by the management apparatus 10.

The use right allocation unit 18 allocates, in accordance with the use right information held by the use right information holding unit 16, the use rights of the resources to the information processing apparatus to which the allocation of the use rights of the resources is specified. Further, the use right allocation unit 18 collects the use rights allocated to the information processing apparatuses 20, 30, and 40 and redistributes them.

Next, referring to FIGS. 7 through 16, a description is made of a more specific example of collectively managing the use rights of the hardware resources according to the embodiment of the present invention.

In the example to be described below, the units of the cores of the CPUs are regarded as the minimum units of logical resources, to which the use rights are allocated, for the purpose of facilitating the description. The units of the cores of the CPUs can be regarded not only as the units of physical resources but also as logical units obtained by dividing one-chip physical CPUs.

Further, as for the memory resources, it is assumed that one of the divided regions of the logical memories is automatically allocated to one core. For example, a 4 GB memory is divided into regions each having 1 GB, and the 1 GB memory is activated when the resource of one core is activated.

Figure 7:
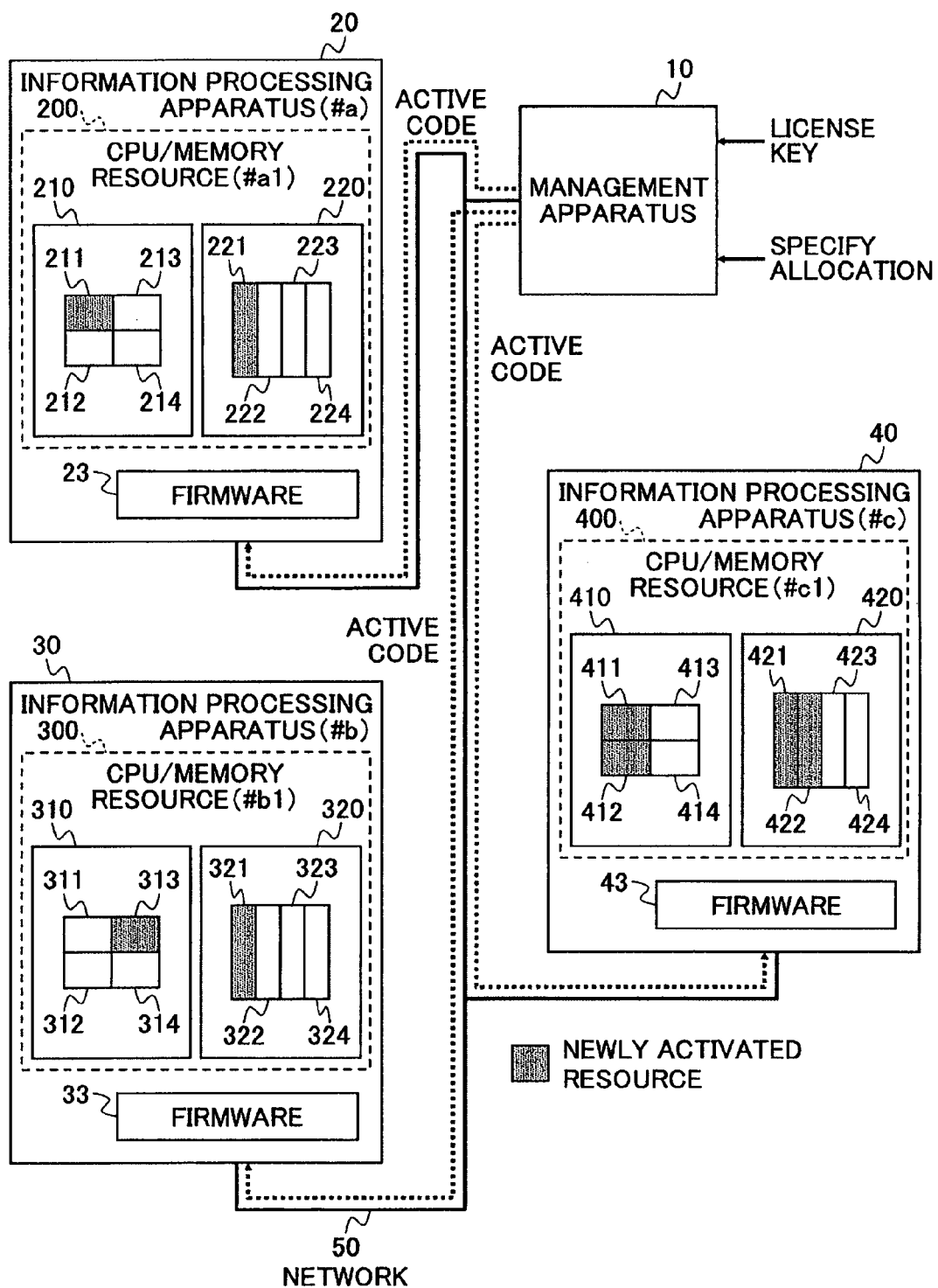
FIG. 7 is a diagram for illustrating an example of distributing the use rights of resources according to the embodiment of the present invention.

FIG. 7 is a diagram for illustrating an example of distributing the use rights of the resources according to the embodiment of the present invention.

In FIG. 7, it is assumed that a CPU/memory resource (#b1) 300 of the information processing apparatus (#b) 30 and a CPU/memory resource (#c1) 400 of the information processing apparatus (#c) 40 are similar in configuration to the CPU/memory resource (#a1) 200 of the information processing apparatus (#a) 20 illustrated in FIG. 3.

In other words, the CPU/memory resource (#b1) 300 has a CPU 310 and a memory 320. The CPU 310 has the four cores composed of a core (#b1) 311, a core (#b2) 312, a core (#b3) 313, and a core (#b4) 314. The memory 320 has the four divided regions composed of a memory (#b1) 321, a memory (#b2) 322, a memory (#b3) 323, and a memory (#b4) 324.

Further, the CPU/memory resource (#c1) 400 has a CPU 410 and a memory 420. The CPU 410 has a core (#c1) 411, a core (#c2) 412, a core (#c3) 413, and a core (#c4) 414. The memory 420 has the four divided regions composed of a memory (#c1) 421, a memory (#c2) 422, a memory (#c3) 423, and a memory (#c4) 424.

The CPU/memory resource (#a1) 200 of the information processing apparatus (#a) 20, the CPU/memory resource (#b1) 300 of the information processing apparatus (#b) 30, and the CPU/memory resource (#c1) 400 of the information processing apparatus (#c) 40 are unused CPU/memory resources in the respective information processing apparatuses at the introduction into the system.

Here, it is assumed that since the operations of the information processing apparatuses 20, 30, and 40 are increased, the user purchases from a manufacturer the use rights of the resources corresponding to one CPU, i.e., four cores in order to strengthen the resources of the information processing apparatuses 20, 30, and 40. A license key acquired from the manufacturer is licensing information of the resources corresponding to the four cores.

When the user inputs the license key to the management apparatus 10, the license key reception unit 15 authenticates the license key. After verifying the acquisition of the use rights corresponding to the four cores based on the authentication of the license key, the license key reception unit 15 holds use right information corresponding to the acquired use rights in the use right information holding unit 16.

The allocation specification unit 17 determines the allocation of the use rights to the information processing apparatuses 20, 30, and 40. Here, it is assumed that the allocation of the use rights to the information processing apparatuses 20, 30, and 40 is determined by the user.

Figure 8:
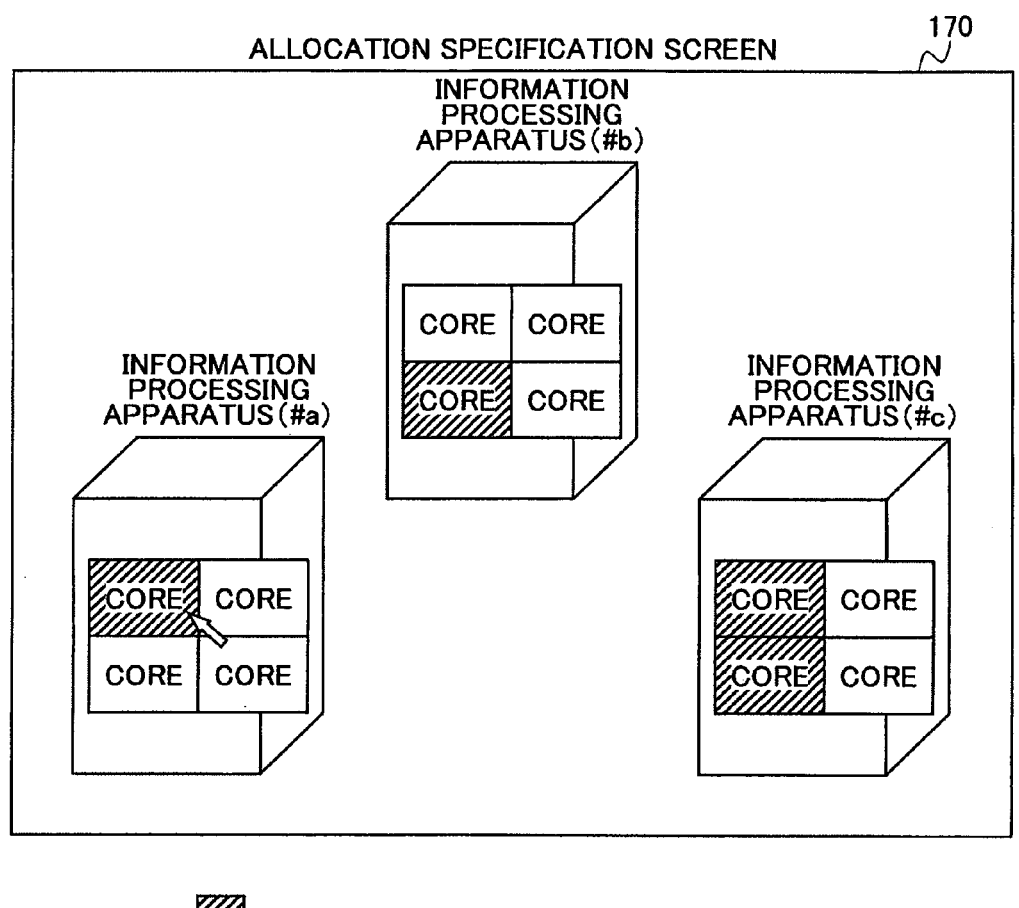
FIG. 8 is a diagram illustrating an example of a resource allocation specification screen according to the embodiment of the present invention.

FIG. 8 is a diagram illustrating an example of a resource allocation specification screen according to the embodiment of the present invention.

The allocation specification unit 17 refers to the apparatus information management table 140, the status information management table 141, and the like of the database 14 and acquires the configurations of the information processing apparatuses 20, 30, and 40 and information such as the ON/OFF statuses of the resources. The allocation specification unit 17 displays the configurations of the information processing apparatuses 20, 30, and 40, the ON/OFF statuses of the resources, or the like on an allocation specification screen 170 displayed on the display unit (not shown) of the management apparatus 10.

In the example illustrated in FIG. 8, the unused CPU/memory resources 200, 300, and 400 of the information processing apparatuses 20, 30, and 40 are displayed. In the example illustrated in FIG. 8, the cores of the unused CPUs are particularly displayed. Note that the CPU/memory resources now in use and the load conditions of the resources may be displayed together with the unused CPU/memory resources.

By using an input device such as a mouse, the user specifies on the allocation specification screen 170 the cores of the unused CPUs to which the use rights are allocated. In allocating the use rights to the resources, the use right allocation unit 18 allocates the use rights to the cores of the unused CPUs specified by the user.

The use right allocation unit 18 allocates the use rights to the resources of the information processing apparatuses 20, 30, and 40 based on the allocation of the use rights of the resources determined by the allocation specification unit 17 in accordance with the held information of the use rights.

Here, as illustrated in FIG. 7, it is assumed that the acquired use rights corresponding to the four cores are allocated to the core (#a1) 211 of the information processing apparatus (#a) 20, the core (#b3) 313 of the information processing apparatus (#b) 30, and the core (#c1) 411 and the core (#c2) 412 of the information processing apparatus (#c) 40.

The use right allocation unit 18 transmits active codes to the firmware programs 23, 33, and 43 of the information processing apparatuses 20, 30, and 40. The active codes are information for activating the resources to which the use rights are allocated. The active codes include information unique to the resources for specifying the resources to be activated.

The firmware programs 23, 33, and 43 of the information processing apparatuses 20, 30, and 40 activate the resources specified by the active codes. For example, in the information processing apparatus (#a) 20, the firmware program 23 activates the core (#a1) in accordance with the active code received from the management apparatus 10.

Note that the use right allocation unit 18 may specify the use rights of the resources to be allocated to the information processing apparatuses rather than specifying the individual resources to be activated with respect to the information processing apparatuses. For example, the firmware program 23 of the information processing apparatus (#a) 20, which has received from the management apparatus 10 information for allocating the use right corresponding to one core, may select and activate one of the unused cores of the information processing apparatus (#a) 20.

Note that in a case where the automatically-acquired use rights are allocated by the management apparatus 10, the allocation specification unit 17 allocates the use rights of the possessed resources in accordance with a predetermined policy.

For example, in order to keep a load balance between the information processing apparatuses 20, 30, and 40, the use rights of the resources to be added are allocated in descending order of the loads of the resources based on the load conditions of the resources now in use of the information processing apparatuses 20, 30, and 40.

Further, the acquired use rights may be held rather than being exercised immediately. In other words, the use right allocation unit 18 may monitor the load conditions of the information processing apparatuses 20, 30, and 40 and allocate the required use rights to the information processing apparatus determined to be overloaded. For example, information on the unexercised use rights is held in the use right information holding unit 16. The use right allocation unit 18 monitors the load condition management table 142 periodically updated by the load condition management unit 13, and allocates the possessed use rights to the resources of the corresponding information processing apparatuses if some of the information processing apparatuses use the resources at a rate equal to or greater than a threshold.

Figure 9:
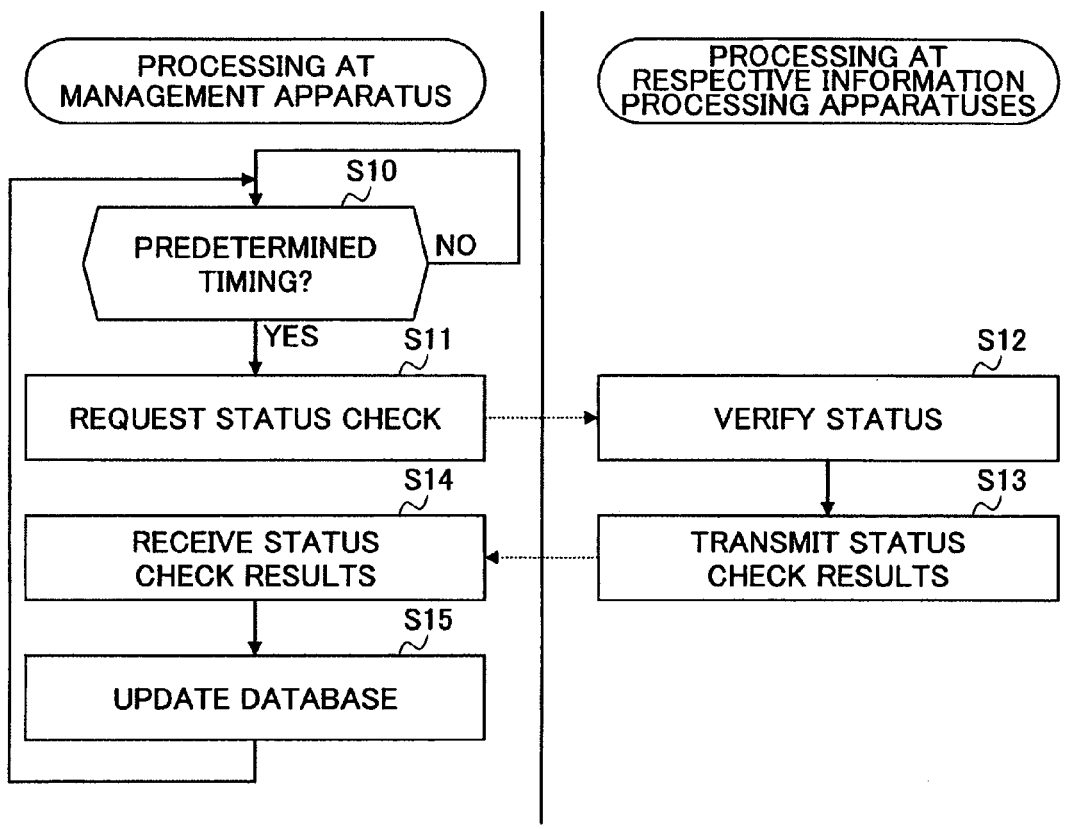
FIG. 9 is a flowchart for illustrating the flow of distributing the acquired use rights according to the embodiment of the present invention.
Figure 10:
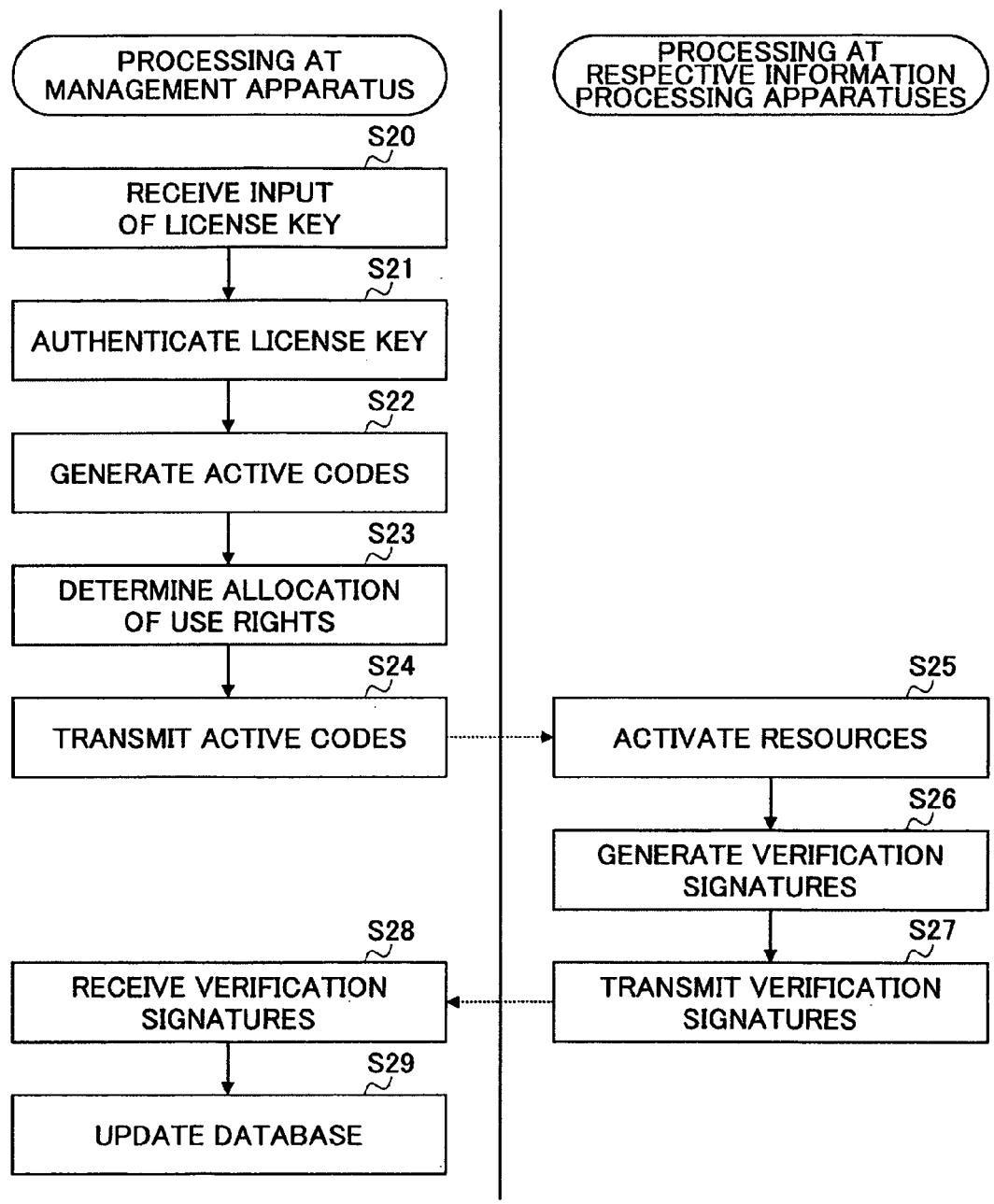
FIG. 10 is a flowchart for illustrating the flow of distributing the acquired use rights according to the embodiment of the present invention.

FIGS. 9 and 10 are flowcharts for illustrating the flows of distributing the acquired use rights according to the embodiment of the present invention.

The examples of the processing illustrated in FIGS. 9 and 10 correspond to the example of distributing the acquired use rights illustrated in FIG. 7.

In the management apparatus 10, the status information management unit 12 determines timing for periodically checking the statuses (step S10). At the predetermined timing (YES in step S10), the status information management unit 12 transmits status check requests to the respective information processing apparatuses 20, 30, and 40 (step S11).

Upon receiving the status check requests from the management apparatus 10, the respective firmware programs 23, 33, and 43 of the information processing apparatuses 20, 30, and 40 check the statuses of the resources inside the self apparatuses (step S12) and transmits status check results to the management apparatus 10 (step S13).

In the management apparatus 10, upon receiving the status check results from the respective information processing apparatuses 20, 30, and 40 (step S14), the status information management unit 12 updates the status information management table 141 with information on the received status check results (step S15).

As described above, by periodically checking the statuses of the resources of the information processing apparatuses 20, 30, and 40, the management apparatus 10 recognizes whether the resources of the information processing apparatuses 20, 30, and 40 are active/inactive.

In the management apparatus 10, upon receiving the input of the license key by the user (step S20), the license key reception unit 15 authenticates the input license key (step S21). Here, the acquisition of the use rights corresponding to one CPU, i.e., the four cores is verified by the authentication of the license key. Information on the acquired use rights is held in the use right information holding unit 16. The license key reception unit 15 generates the active codes corresponding to the number of the acquired use rights (step S22). Here, the frame of the active codes corresponding to the four cores is generated.

When the allocation of the use rights is determined (step S23), the use right allocation unit 18 transmits the active codes containing specification information on the allocation of the use rights of the resources to the corresponding information processing apparatuses to which the use rights of the resources are allocated (step S24). For example, in the information processing apparatus (#a) 20, the active code containing information unique to the core (#a1) 211 to which the use rights are allocated at this time is transmitted.

In the respective information processing apparatuses 20, 30, and 40 having received the active codes, the firmware programs 23, 33, and 43 activate the resources specified by the received active codes (step S25). For example, in the information processing apparatus (#a) 20, the firmware program 23 activates the core (#a1) 211 specified by the active code. After successfully activating the resources, the firmware programs 23, 33, and 43 generate respective verification signatures that verify the successes in activating the resources (step S26) and transmit them to the management apparatus 10 (step S27). Note that if the firmware programs cannot activate the resources due to the malfunctions of the resources or the like, they report the fact to the management apparatus 10.

In the management apparatus 10, upon receiving the verification signatures from the information processing apparatuses 20, 30, and 40 (step S28), the status information management unit 12 sets the statuses of the resources of the status information management table 141 of the database 14 to ON (step S29).

As described above, since the management apparatus 10 collectively manages the use rights of the hardware resources licensed for the entire information processing system, the use rights can be allocated to the corresponding information processing apparatuses. Further, since the management apparatus 10 manages the use rights of the hardware resources on a logical unit basis, the entire information processing system can be operated with the securing of the minimum resources. Thus, the user is only required to purchase the use rights of the minimum hardware resources, which in turn reduces the burden of expenses for the user.

Figure 11:
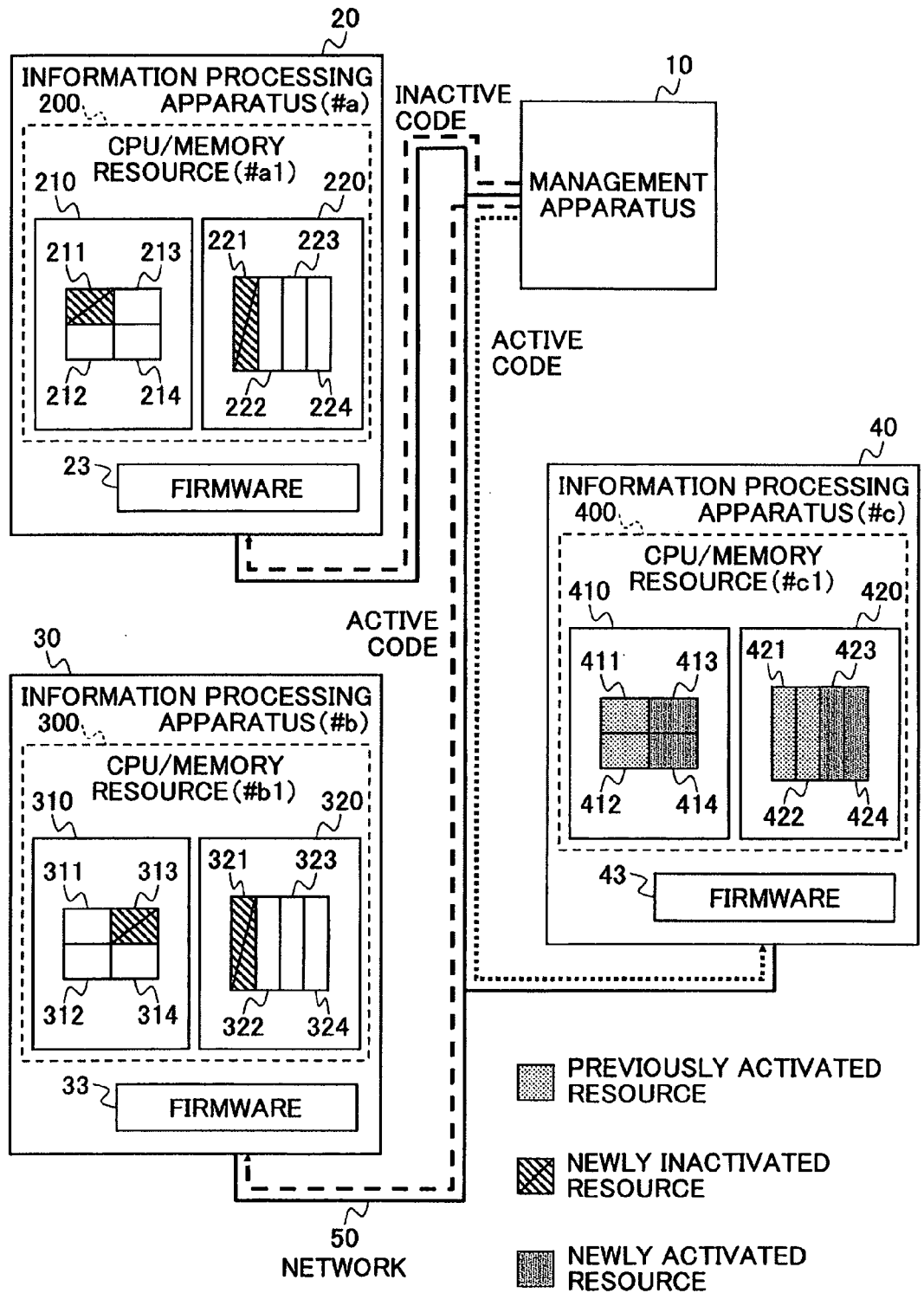
FIG. 11 is a diagram for illustrating an example of stopping and redistributing the use rights of the resources according to the embodiment of the present invention.

FIG. 11 is a diagram for illustrating an example of stopping and redistributing the use rights of the resources according to the embodiment of the present invention.

In FIG. 11, it is assumed that the core (#a1) 211 of the information processing apparatus (#a) 20, the core (#b3) 313 of the information processing apparatus (#b) 30, and the core (#c1) 411 and the core (#c2) 412 of the information processing apparatus (#c) 40 are used in an active state.

In the management apparatus 10, the load condition management unit 13 monitors the load conditions of the resources of the information processing apparatuses 20, 30, and 40 and updates the load condition management table 142 of the database 14. The use right allocation unit 18 monitors the load condition management table 142 of the database 14 and stops and redistributes the use rights of the resources in accordance with the load conditions of the information processing apparatuses 20, 30, and 40.

For example, it is assumed that the use rates of the core (#c1) 411 and the core (#c2) 412 exceed a predetermined threshold α in the information processing apparatus (#c) 40.

The use right allocation unit 18 refers to the load condition management table 142 to verify that the use rates of the core (#c1) 411 and the core (#c2) 412 of the information processing apparatus (#c) 40 exceed the predetermined threshold α. Further, the use right allocation unit 18 calculates the number of the cores required to prevent the use rates of the resources in the information processing apparatus (#c) 40 from exceeding the threshold α. Here, it is assumed that the use rights corresponding to two cores are required.

The use right allocation unit 18 checks the load conditions of the resources of the other information processing apparatuses (#a) 20 and (#b) 30 to verify which of the resources have a low use rate. Here, it is assumed that the core (#a1) 211 of the information processing apparatus (#a) 20 and the core (#b3) 313 of the information processing apparatus (#b) 30 are verified as such.

The use right allocation unit 18 transmits inactive codes to the information processing apparatus (#a) 20 and the information processing apparatus (#b) 30 to verify whether the resources of the core (#a1) 211 and the core (#b3) 313 can be stopped.

The firmware programs 23 and 33 of the information processing apparatuses 20 and 30 respectively verify whether the core (#a1) 211 and the core (#b3) 313 can be stopped. If the corresponding cores can be stopped, the firmware programs 23 and 33 stop them and report the fact to the management apparatus 10. If the corresponding cores cannot be stopped due, for example, to a difficulty in separating the software programs from the CPUs immediately, the firmware programs 22 and 33 report the fact to the management apparatus 10.

Based on the reports from the information processing apparatuses, the use right allocation unit 18 collects the use rights allocated to the corresponding resources if the resources can be stopped.

Here, it is assumed that the core (#a1) 211 and the core (#b3) 313 can be stopped. Since the resources of the two cores are stopped, use rights corresponding to the two cores are generated.

The use right allocation unit 18 allocates, to the resources of the information processing apparatus (#c) 40 having high loads, active codes corresponding to the use rights thus generated. Here, the generated use rights corresponding to the two cores are allocated to the core (#c3) 413 and the core (#c4) 414 of the information processing apparatus (#c) 40 having the high loads.

The use right allocation unit 18 transmits the active codes to the firmware program 43 of the information processing apparatus (#c) 40.

The firmware program 43 of the information processing apparatus (#c) 40 activates the specified resources by the active codes. Here, the firmware program 43 activates the core (#c3) 413 and the core (#c4) 414 in accordance with the active codes received from the management apparatus 10.

Note that in the example illustrated in FIG. 11, the use rights of the resources are stopped and redistributed on a logical resource basis with respect to the spare CPU/memory resources 200, 300, and 400 which are unused at the introduction into the system of the information processing apparatuses 20, 30, and 40. Alternatively, the use rights of the resources may be stopped and redistributed on a logical resource basis with respect to all the resources of the information processing apparatuses 20, 30, and 40 including the CPU/memory resources which have been used since the introduction into the system. For example, it is possible to stop the CPU/memory resource 22 of the information processing apparatus (#a) 20 which has been used since the introduction into the system on a core basis and allocate the resulting use rights to the other information processing apparatuses 30 and 40.

Figure 12:
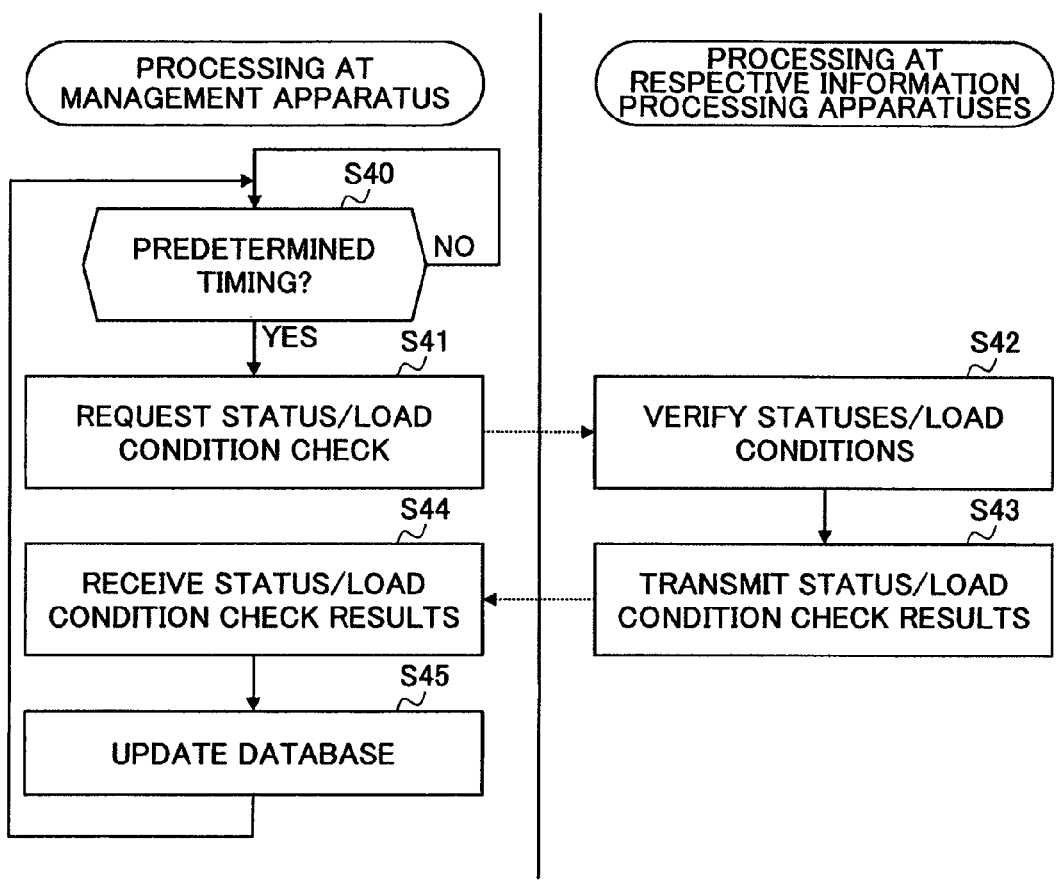
FIG. 12 is a flowchart illustrating the flow of redistributing the use rights according to the embodiment of the present invention.
Figure 13:
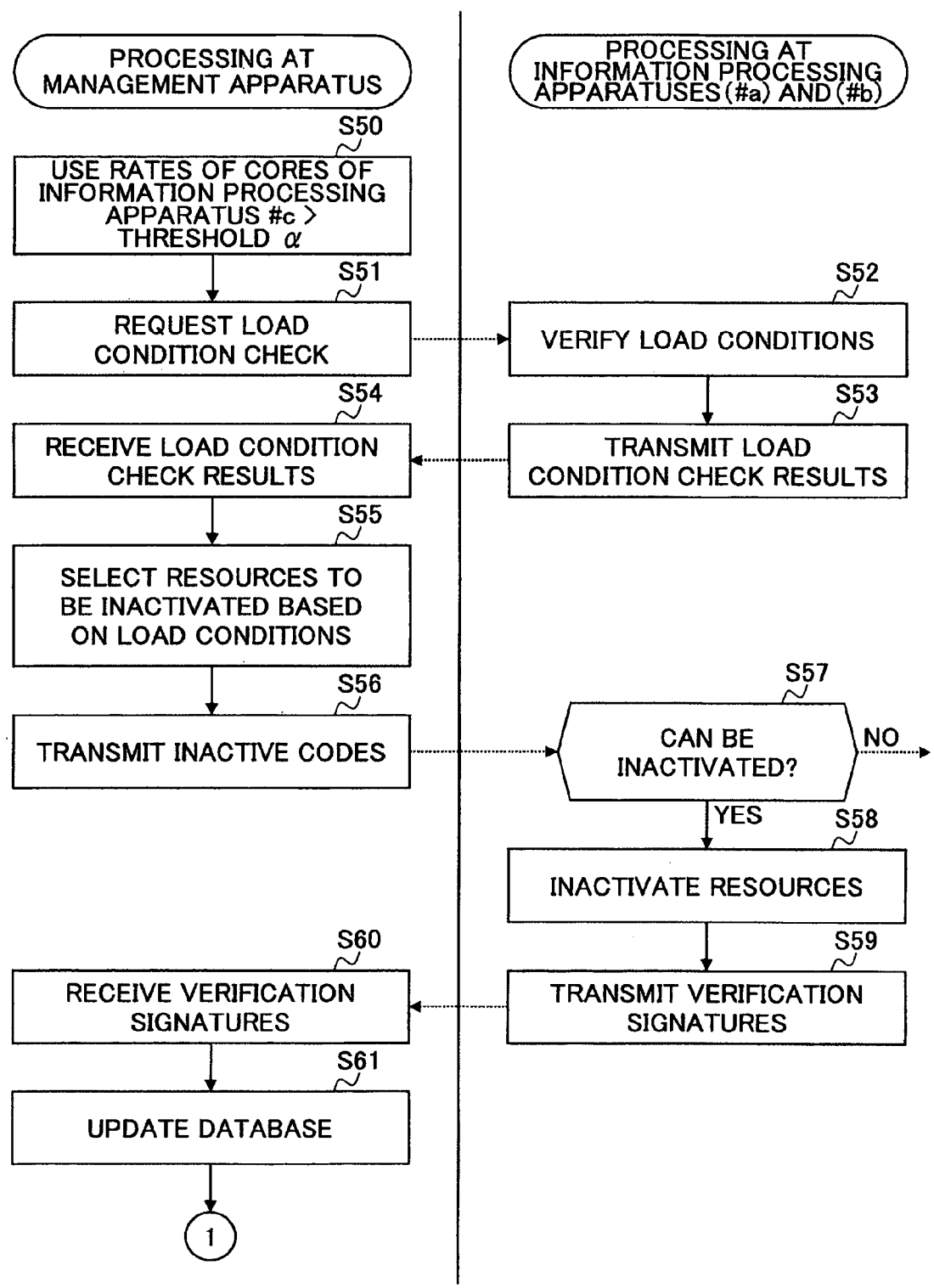
FIG. 13 is a flowchart illustrating the flow of redistributing the use rights according to the embodiment of the present invention.
Figure 14:
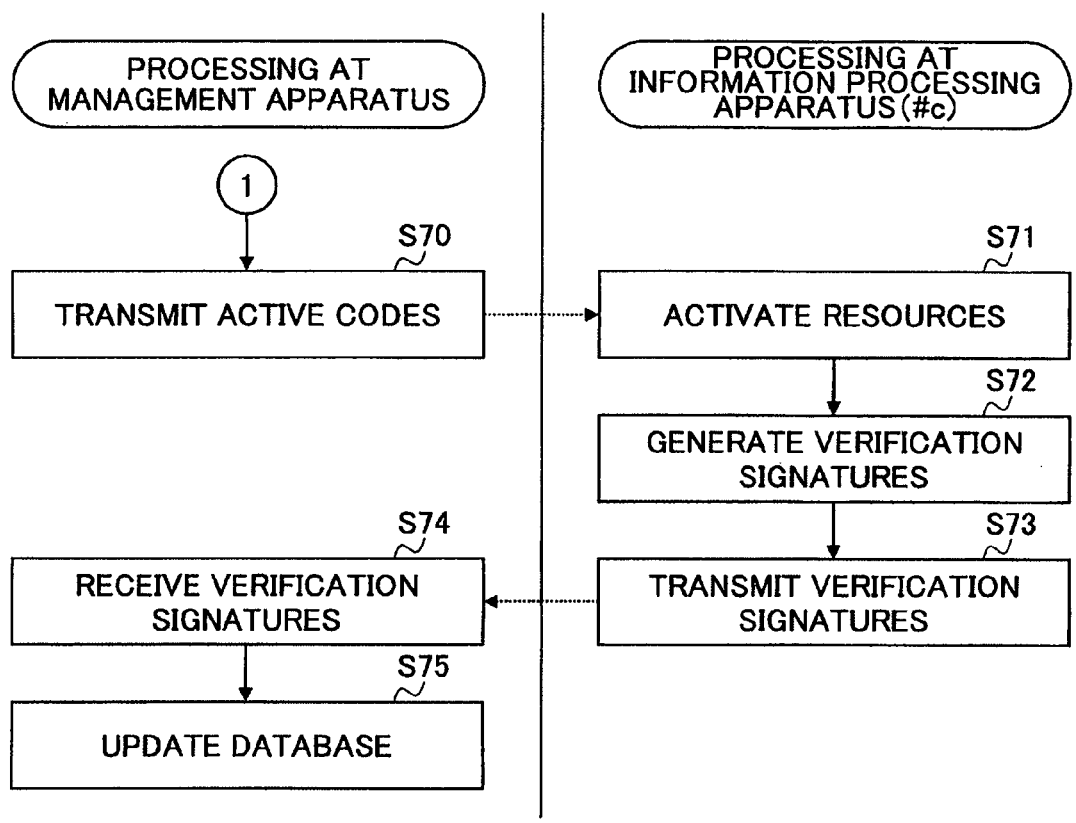
FIG. 14 is a flowchart illustrating the flow of redistributing the use rights according to the embodiment of the present invention.

FIGS. 12 through 14 are flowcharts illustrating the flows of redistributing the use rights according to the embodiment of the present invention.

The examples of the processing illustrated in FIGS. 12 and 14 correspond to the example of redistributing the use rights illustrated in FIG. 11.

In the management apparatus 10, at predetermined timing (step S40), the status information management unit 12 and the load condition management unit 13 transmit status check requests and load condition check requests, respectively, to the information processing apparatuses 20, 30, and 40 (step S41).

In the information processing apparatuses 20, 30, and 40, upon receiving the status check requests and the load condition check requests, the firmware programs 23, 33, and 44 check the statuses and the load conditions of the resources of the self apparatuses (step S42) and transmit the status check results and the load condition check results of the self apparatuses to the management apparatus 10 (step S43).

In the management apparatus 10, upon receiving the status check results and the load condition check results from the information processing apparatuses 20, 30, and 40 (step S44), the status information management unit 12 and the load condition management unit 13 update the status information management table 141 and the load condition management table 142 with information on the status check results and the load condition check results, respectively (step S45).

As described above, by periodically checking the statuses and the load conditions of the resources of the information processing apparatuses 20, 30, and 40, the management apparatus 10 recognizes the active/inactive statuses and the load conditions of the information processing apparatuses 20, 30, and 40.

In the management apparatus 10, the use right allocation unit 18 monitors the load condition management table 142 of the database 14 and verifies that the use rates of the core (#c1) 411 and the core (#c2) 412 exceed the predetermined threshold α (step S50).

The load condition management unit 13 transmits the load condition check requests to the information processing apparatus (#a) 20 and the information processing apparatus (#b) 30 other than the information processing apparatus (#c) 40 (step S51).

In the information processing apparatuses 20 and 30, upon receiving the load condition check requests, the firmware programs 23 and 33 check the load conditions of the resources of the self apparatuses (step S52) and transmit the load condition check results to the management apparatus 10 (step S53).

In the management apparatus 10, the load condition management unit 13 receives the load condition check results from the information processing apparatuses 20 and 30 (step S54).

Based on the load conditions of the resources of the information processing apparatuses 20 and 30, the use right allocation unit 18 determines which of the resources of the information processing apparatuses 20 and 30 are to be inactivated (step S55). Here, the core (#a1) 211 of the information processing apparatus (#a) 20 and the core (#b3) 313 of the information processing apparatus (#b) 30 having low use rates are determined as the resources to be inactivated.

The use right allocation unit 18 transmits inactive codes as information for inactivating the resources to be inactivated to the information processing apparatuses 20 and 30 (step S56). To the information processing apparatus (#a) 20 is transmitted the inactive code containing information unique to the core (#a1) 211 which is to be stopped at this time. To the information processing apparatus (#b) 30 is transmitted the inactive code containing information unique to the core (#b3) 313 which is to be stopped at this time.

In the information processing apparatuses 20 and 30 having received the inactive codes, the firmware programs 23 and 33 determine whether the resources specified by the inactive codes can be inactivated (step S57). If it is determined that the specified resources can be inactivated (YES in step S57), the firmware programs 23 and 33 inactivate the resources (step S58). After successfully inactivating the resources, the firmware programs 23 and 33 generate verification signatures that verify the successes in activating the resources and transmit them to the management apparatus 10 (step S59).

Note that if the resources specified by the inactive codes cannot be inactivated due, for example, to a difficulty in separating the software programs from the CPUs immediately (NO in step S57), the firmware programs 22 and 33 take predetermined measures, such as reporting the fact to the management apparatus 10 and being on standby until the resources can be inactivated. When being reported by the information processing apparatuses that the resources cannot be inactivated, the use right allocation unit 18 determines again which of the resources of the information processing apparatuses are to be inactivated.

In the management apparatus 10, upon receiving the verification signatures from the information processing apparatuses 20 and 30 (step S60), the status information management unit 12 sets the statuses of the corresponding resources of the status information management table 141 of the database 14 to OFF (step S61).

Accordingly, when the use rights corresponding to the two cores are stopped, the use rights corresponding to the two cores are acquired and the frame of the active codes corresponding to the two cores is generated.

The use right allocation unit 18 transmits the active codes containing specification information on the allocation of the use rights of the resources to the information processing apparatus (#c) 40 having the degraded load condition (step S70). Here, the active code containing information unique to the core (#c3) 413 and the active code containing information unique to the core (#c4) 414, to which the use rights are to be allocated at this time, are transmitted to the information processing apparatus (#c) 40.

In the information processing apparatus (#c) 40 having received the active codes, the firmware program 43 activates the resources specified by the active codes (step S71). Here, the firmware program 43 activates the core (#c3) 413 and the core (#c4) 414. After successfully activating the resources, the firmware program 43 generates verification signatures that verify the successes in activating the resources (step S72) and transmit them to the management apparatus 10 (step S73). Note that if the firmware program cannot activate the resources due to the malfunctions of the resources or the like, it reports the fact to the management apparatus 10.

In the management apparatus 10, upon receiving the verification signatures from the information processing apparatus (#c) 40 (step S74), the status information management unit 12 sets the statuses of the corresponding resources of the status information management table 141 of the database 14 to ON (step S75).

As described above, by collectively managing the use rights of the hardware resources licensed for the entire information processing system, the management apparatus 10 can redistribute the use rights of the hardware resources in the information processing system in accordance with the changes of the load conditions of the information processing apparatuses. Accordingly, the user is only required to provide the use rights of the minimum hardware resources, which in turn reduces the burden of expenses for the user.

Figure 15:
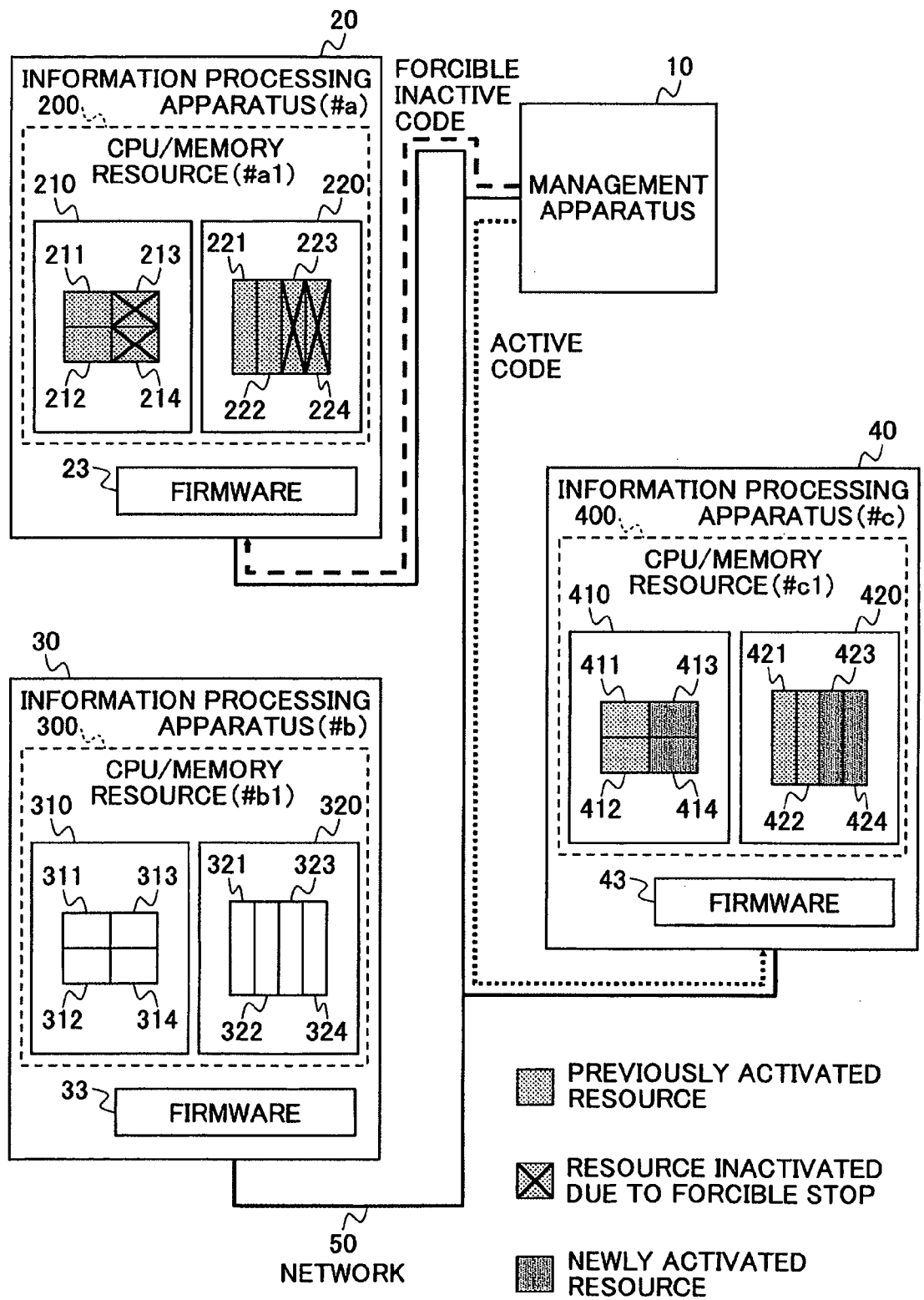
FIG. 15 is a diagram for illustrating an example of forcibly acquiring the use rights of the resources according to the embodiment of the present invention.

FIG. 15 is a diagram for illustrating an example of forcibly acquiring the use rights of the resources according to the embodiment of the present invention.

In FIG. 15, it is assumed that the core (#a1) 211, the core (#a2) 212, the core (#a3) 213, and the core (#a4) 214 of the information processing apparatus (#a) 20 and the core (#c1) 411 and the core (#c2) 412 of the information processing apparatus (#c) 40 are used in an active state.

In the management apparatus 10, the load condition management unit 13 monitors the load conditions of the resources of the information processing apparatuses 20, 30, and 40 and updates the load condition management table 142 of the database 14. The use right allocation unit 18 monitors the load condition management table 142 of the database 14.

At this time, it is assumed that the use rates of the core (#c1) 411 and the core (#c2) 412 exceed a predetermined threshold $\beta$ in the information processing apparatus (#c) 40. It is also assumed that the threshold $\beta$ is set to be greater than the threshold $\alpha$ described above.

The use right allocation unit 18 refers to the load condition management table 142 to verify that the use rates of the core (#c1) 411 and the core (#c2) 412 of the information processing apparatus (#c) 40 exceeds the predetermined threshold $\beta$.

At this time, the use right allocation unit 18 determines that major trouble may have occurred in the information processing apparatus (#c) 40 and forcibly acquires the use rights of the resources from the information processing apparatuses 20 and 30 other than the information processing apparatus (#c) 40. Here, it is assumed that the use right allocation unit 18 forcibly acquires the use rights of the core (#a3) 213 and the core (#a4) 214 from the information processing apparatus (#a) 20 in order of predetermined priority.

The use right allocation unit 18 transmits forcible inactive codes to the information processing apparatus (#a) 20 to stop the core (#a3) 213 and the core (#a4) 214 and acquires the use rights corresponding to the two cores.

Upon receiving the forcible inactive codes, the firmware program 23 of the information processing apparatus (#a) 20 stops the core (#a3) 213 and the core (#a4) 214 and reports the fact that the cores have been stopped to the management apparatus 10. At this time, the firmware program 23 does not particularly verify whether the cores have been stopped. In other words, even if the software programs cannot be immediately separated from the CPUs, the corresponding cores are forcibly stopped and inactivated.

Since the cores (#a3) 213 and the core (#a4) 214 are stopped, use rights corresponding to the two cores are generated.

The use right allocation unit 18 allocates, to the resources of the information processing apparatus (#c) 40 having the high loads, active codes corresponding to the use rights thus generated. Here, the generated use rights corresponding to the two cores are allocated to the core (#c3) 413 and the core (#c4) 414 of the information processing apparatus (#c) 40.

The use right allocation unit 18 transmits the active codes to the firmware program 43 of the information processing apparatus (#c) 40.

The firmware program 43 of the information processing apparatus (#c) 40 activates the specified resources by the active codes. Here, the firmware program 43 activates the core (#c3) 413 and the core (#c4) 414 in accordance with the active codes received from the management apparatus 10.

Note that in the example illustrated in FIG. 15, the use rights of the resources are forcibly acquired on a logical resource basis with respect to the spare CPU/memory resources 200, 300, and 400 which are unused at the introduction into the system of the information processing apparatuses 20, 30, and 40. Alternatively, the use rights of the resources may be forcibly acquired on a logical resource basis with respect to all the resources of the information processing apparatuses 20, 30, and 40 including the CPU/memory resources which have been used since the introduction into the system. For example, it is possible to forcibly stop the CPU/memory resource 22 which has been used since the introduction into the system of the information processing apparatus (#a) 20 on a core basis and allocate the resulting use rights to the other information processing apparatuses 30 and 40.

Figure 16:
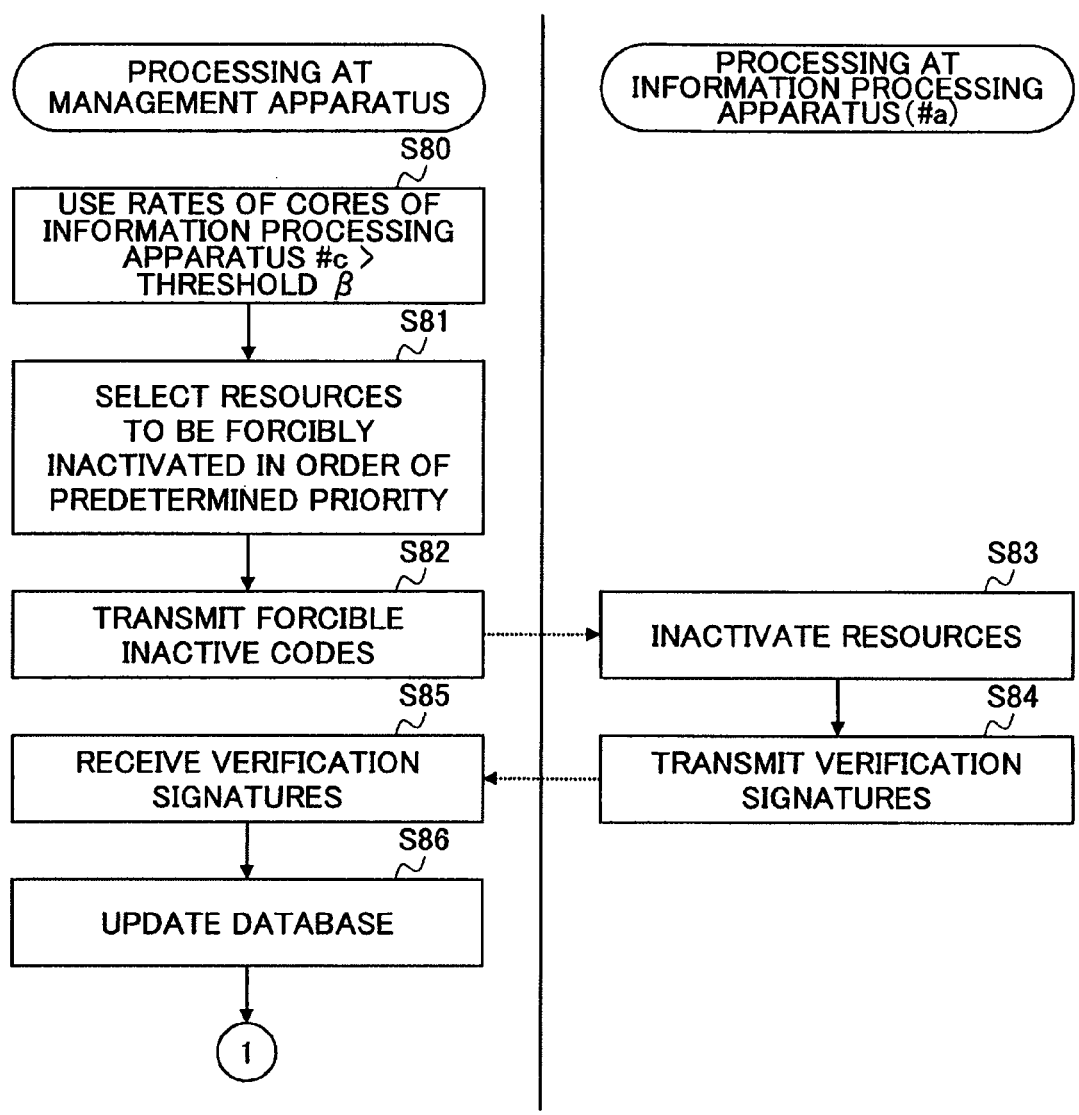
FIG. 16 is a flowchart illustrating the flow of forcibly acquiring the use rights according to the embodiment of the present invention.

FIG. 16 is a flowchart illustrating the flow of forcibly acquiring the use rights according to the embodiment of the present invention.

The example of the processing where the processing steps illustrated in FIGS. 12, 14, and 16 are combined together corresponds to the example of forcibly acquiring the use rights illustrated in FIG. 15.

With the processing illustrated in FIG. 12, the management apparatus 10 periodically checks the statuses and the load conditions of the resources of the information processing apparatuses 20, 30, and 40 to recognize the active/inactive statuses and the load conditions of the resources of the information processing apparatuses 20, 30, and 40.

In the management apparatus 10, the use right allocation unit 18 monitors the load condition management table 142 of the database 14 and verifies that the use rates of the core (#c1) 411 and the core (#c2) 412 exceed the threshold β (step S80).

The use right allocation unit 18 determines which of the resources are to be forcibly inactivated in order of the predetermined priority (step S81). Here, it is assumed that the core (#a3) 213 and the core (#a4) 214 of the information processing apparatus (#a) 20 are determined as the resources to be forcibly inactivated.

The use right allocation unit 18 transmits the forcible inactive codes as inactivating information for inactivating the resources to be forcibly inactivated to the information processing apparatus 20 (step S82). To the information processing apparatus (#a) 20 are transmitted the forcible inactive code containing information unique to the core (#a1) 213 which is to be stopped at this time and the forcible inactive code containing information unique to the core (#b3) 214 which is to be stopped at this time.

In the information processing apparatus (#a) 20 having received the forcible inactive codes, the firmware program 23 inactivates the resources specified by the forcible inactive codes (step S83). The firmware program 23 generates respective verification signatures that verify the successes in inactivating the resources and transmits them to the management apparatus 10 (step S84).

In the management apparatus 10, upon receiving the verification signatures from the information processing apparatus 20 (step S85), the status information management unit 12 sets the statuses of the corresponding resources of the status information management table 141 of the database 14 to OFF (step S86).

Accordingly, when the use rights corresponding to the two cores are forcibly acquired, the use rights corresponding to the two cores are acquired and the frame of the active codes corresponding to the two cores is generated. Then, with the processing illustrated in FIG. 14, the use rights of the resources are allocated to the core (#c3) 413 and the core (#c4) 414 of the information processing apparatus (#c) 40.

As described above, the management apparatus 10 can forcibly acquire the use rights of the hardware resources from any of the information processing apparatuses. Thus, for example, if the processing performance of one of the information processing apparatuses inside the information processing system is degraded due to the failures of the CPU, the use rights forcibly acquired from the other information processing apparatuses are allocated to the corresponding information processing apparatus to temporarily restore the processing performance. As such, the management apparatus according to the embodiment of the present invention can deal with emergency cases.

The processing by the management apparatus 10 and the information processing apparatuses 20, 30, and 40 can be implemented by hardware devices and software programs such as CPUs and memories provided in the computers.

The embodiment of the present invention is described above, but variations and modifications may be made without departing from the scope of the present invention.

For example, the embodiment of the present invention describes the case in which the units of the cores of the CPUs are used as the units of the predetermined logical resources to which the use rights are allocated. However, the units of the threads of the CPUs may be used as the units of the predetermined logical resources. Further, the units of the performance where the performance of the CPUs is used by 60% and the units of divided frequencies where the operating frequencies of the CPUs are divided may be used as the units of the predetermined logical resources.

Since the logical resource units are used to manage the use rights of the hardware resources, the logical resource units to which the use rights are allocated can be freely set.

The present invention is related to technologies used in systems having plural information processing apparatuses such as server systems.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. An information processing system comprising:
plural information processing apparatuses that have respective hardware resources including hardware resources to be licensed, each information processing apparatus performing information processing using the licensed hardware resources in which use rights are allocated; and
a management apparatus that is connected to the plural information processing apparatuses and manages the hardware resources of the plural information processing apparatuses, the management apparatus including—
a use right information holding unit that holds use right information corresponding to the use rights of the hardware resources, and
a use right allocation unit that
checks load conditions of the plural information processing apparatuses, and
allocates the use rights to the hardware resources on a hardware resource basis in accordance with the held use right information, wherein
when the loads of any of the plural information processing apparatuses become high, the use rights allocated to hardware resources of the other information processing apparatus is forcibly suspended, and
the suspended use rights allocated to the hardware resources of the other information processing apparatus is allocated to the information processing apparatuses having the high loads.

2. The information processing system according to claim 1, wherein
the use right information is information on the use rights with respect to unused hardware resources, and
the use right allocation unit allocates the use rights to the unused hardware resources of the respective information processing apparatuses.

3. The information processing system according to claim 1, wherein
the use right allocation unit
determines, when the loads of any of the plural information processing apparatuses become high, whether the use rights allocated to the hardware resources of the other information processing apparatus can be suspended and
allocates, if the use rights allocated to the hardware resources of the other information processing apparatus can be suspended, the use rights allocated to the hardware resources of the other information processing apparatus to the hardware resources of the information processing apparatus having the high loads.

4. A use right collective management method for collectively managing use rights of hardware resources in an information processing system comprising
plural information processing apparatuses that have respective hardware resources including hardware resources to be licensed and
a management apparatus that is connected to the plural information processing apparatuses and manages the hardware resources of the plural information processing apparatuses, wherein
each of the plural information processing apparatuses performs information processing using the hardware resources licensed in which the use rights are allocated,
the use right collective management method includes—
checking, by the management apparatus that holds use right information as information holding the use rights of the hardware resources in a storage unit, load conditions of the plural information processing apparatuses,
allocating, by the management apparatus, the use rights to the hardware resources on a predetermined hardware resource basis in accordance with the held use right information, wherein
when the loads of any of the plural information processing apparatuses become high, the use rights allocated to hardware resources of the other information processing apparatus is forcibly suspended, and
the suspended use rights allocated to the hardware resources of the other information processing apparatus is allocated to the information processing apparatuses having the high loads.

5. The use right collective management method according to claim 4, wherein
the use right information is information on the use rights with respect to unused hardware resources, and
when allocating the use rights, the use rights to the unused hardware resources of the respective information processing apparatuses are allocated on the predetermined hardware resource basis in accordance with the use right information.

6. The use right collective management method according to claim 5, further comprising:
determining, when the loads of any of the plural information processing apparatuses become high, whether the use rights allocated to the hardware resources of the other information processing apparatus can be suspended; and
allocating, if the use rights allocated to the hardware resources of the other information processing apparatus can be suspended, the use rights allocated to the hardware resources of the other information processing apparatus to the hardware resources of the information processing apparatus having the high loads.

7. A management apparatus, which is connected to plural information processing apparatuses and manages hardware resources of the plural information processing apparatuses, the hardware resources including hardware resources to be licensed, each information processing apparatus performing information processing using the licensed hardware resources in which use rights are allocated, the management apparatus comprising a processor configured to perform a process including:
holding use right information corresponding to the use rights of the hardware resources,
checking load conditions of the plural information processing apparatuses, and
allocating the use rights to the hardware resources on a hardware resource basis in accordance with the held use right information, wherein
when the loads of any of the plural information processing apparatuses become high, the use rights allocated to hardware resources of the other information processing apparatus is forcibly suspended, and
the suspended use rights allocated to the hardware resources of the other information processing apparatus is allocated to the information processing apparatuses having the high loads.

* * * * *